No. 727,417. PATENTED MAY 5, 1903.
J. McMAHON.
DEVICE FOR HANDLING THE BAILS OF VESSELS.
APPLICATION FILED MAR. 18, 1903.
NO MODEL.

WITNESSES:
O. C. Abbott

INVENTOR
James McMahon
BY Munn & Co.
ATTORNEYS.

THE NORRIS PETERS CO., PHOTO-LITHO., WASHINGTON, D. C.

No. 727,417. Patented May 5, 1903.

UNITED STATES PATENT OFFICE.

JAMES McMAHON, OF BEMIDJI, MINNESOTA.

DEVICE FOR HANDLING THE BAILS OF VESSELS.

SPECIFICATION forming part of Letters Patent No. 727,417, dated May 5, 1903.

Application filed March 18, 1903. Serial No. 148,383. (No model.)

*To all whom it may concern:*

Be it known that I, JAMES MCMAHON, a citizen of the United States, and a resident of Bemidji, in the county of Beltrami and State of Minnesota, have invented a new and Improved Device for Handling the Bails of Vessels, of which the following is a full, clear, and exact description.

The purpose of the invention is to provide a handle particularly adapted for application to the bails of such vessels as pots, pans, or kettles when the bails are hot, enabling the vessel to be shifted upon the stove or carried by the bail without inconvenience no matter how hot the bail may be.

A further purpose of the invention is to so construct the handle that it will be simple and inexpensive and so that it may be quickly and expeditiously applied to the bail without any portion of the hand being necessarily brought in engagement with the bail.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
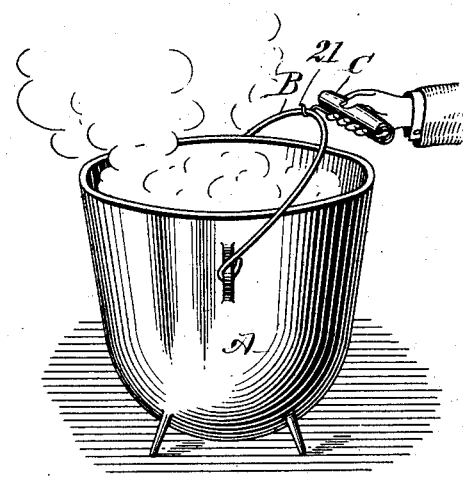
Figure 2:
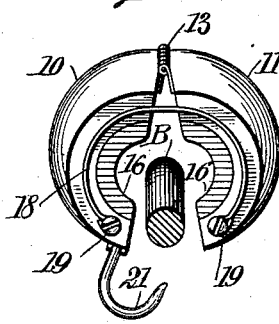
Figure 3:
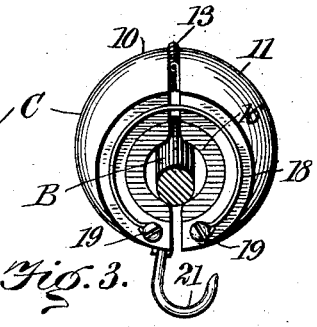
Figure 4:
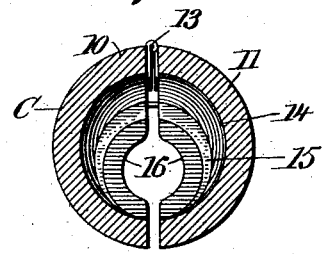
Figure 5:
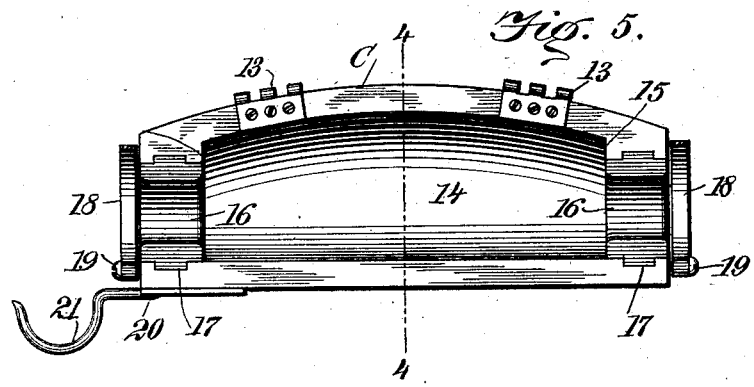

Figure 1 is a perspective view of a kettle and the improved handle applied to the bail of said kettle. Fig. 2 is an end view of the handle open and a sectional view of the bail within the handle. Fig. 3 is a view similar to Fig. 2, the handle being shown closed upon the bail. Fig. 4 is a transverse section through the handle, taken practically on the line 4 4 of Fig. 5; and Fig. 5 is an inner face view of one half or section of the improved handle.

A represents a pot, and B the bail of the same, in connection with which the improved handle C is used. This handle, as is shown in Figs. 2, 3, 4, and 5, is made in two segmental sections 10 and 11, connected at their upper longitudinal edges by a suitable number of hinges 13, so that the said sections may be separated or may be brought together and closed upon the bail B when it is desired to lift the vessel by its bail.

Each section 10 and 11 of the handle is provided with an interior chamber 14, extending an equal distance from each end, forming thereby end shoulders 15, and in the shoulder portions 15 of each section of the handle a washer 16, of leather, rubber, or other soft or yielding material, is secured. These washers may be held in place in any approved manner. As shown in the drawings, they are made with exterior ribs 17, which are made to enter correspondingly-formed grooves in the said shoulder-sections of the handle.

The sections 10 and 11 of the handle are normally held separated at their lower or free edges by springs 18, which are segmental and are attached at their ends to the outer end portions of the sections adjacent to the lower or free longitudinal edges of the sections, as is shown best in Figs. 2 and 3. Each spring is in one piece, forming a bow which crosses the upper space between said sections where the sections are connected by the hinges 13.

The shank 20 of a hook 21 is secured to the under face of one of the sections of the handle, the section 10 preferably, such attachment being made at the left-hand end of the handle, and the hook 21 extends beyond the left-hand end of the handle and is curved so as to extend below the space between the lower edges of the sections of the handle, as is best shown in Fig. 3.

In the application of this device the bail B, if hot, is picked up by the handle C directly through the medium of the hook 21, which is engaged with the bail while it lies in its lower position against the side of the vessel. The bail by this means is carried to an upper position, as is shown in Fig. 1, and the sections of the handle being open at their lower portion the said hook serves to direct the bail into the said lower space between the sections of the handle, whereupon by gripping the handle and closing its sections together the bail will be firmly gripped between the washers 16 of the handle, and the vessel may be lifted from place to place or shifted in a convenient manner without danger of the hand becoming burned or occasioning discomfort to the operator.

The chambers 14 in the sections of the handle serve as air-spaces, and thus tend to cool the major portion of the bail held by the handle, since the bail does not come in contact with the handle-sections except at its end portions.

Having thus described my invention, I claim as new and desire to secure by Letters Patent—

1. A device for handling the bails of vessels, consisting of a handle constructed in spring-controlled sections hinged at one longitudinal edge and capable of separation at their opposing longitudinal edges, and washers located at the inner faces of the sections at points near their ends, as described.

2. A device for handling the bails of vessels, consisting of a handle constructed in spring-controlled sections, hinged at one longitudinal edge and capable of separation at their opposing longitudinal edges, and washers located at the inner faces of the sections at points near their ends, the said sections of the handle being provided with a chamber between the washers, as and for the purpose described.

3. A device for handling the bails of vessels, consisting of a handle constructed in two segmental sections hinged at their upper edges, being free to separate at their lower edges, each section having an interior longitudinal chamber, and washers between the ends of the chambers and the ends of the sections, and a spring at the end of the said handle, connected with both sections and crossing the space between the upper edges of the sections, which spring serves to normally hold the free lower edges of the sections separated, as described.

4. A device for handling the bails of vessels, consisting of a handle constructed in two sections hinged together at one longitudinal edge, the opposing longitudinal edges of the sections being free to move to and from each other, a spring normally holding the free longitudinal edges of the handle-sections separated, and a hook extending from one end of one handle-section, the upturned portion of the hook being directed toward the space between the free edges of the handle-sections, for the purpose described.

In testimony whereof I have signed my name to this specification in the presence of two subscribing witnesses.

JAMES McMAHON.

Witnesses:
L. H. BAILEY,
W. H. ROBERTS.